US012645769B2

(12) United States Patent
    Hashimoto et al.

(10) Patent No.: US 12,645,769 B2
(45) Date of Patent: Jun. 2, 2026

(54) INFORMATION PROCESSING APPARATUS FOR VERIFYING BIOMETRIC AUTHENTICATION SCORES, INFORMATION PROCESSING METHOD, AND NON-TRANSITORY RECORDING MEDIUM

(71) Applicant: NEC Corporation, Tokyo (JP)

(72) Inventors: Hiroshi Hashimoto, Tokyo (JP);
    Akihiro Hayasaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 14 days.

(21) Appl. No.: 18/729,982

(22) PCT Filed: Mar. 16, 2022

(86) PCT No.: PCT/JP2022/012013
    § 371 (c)(1),
    (2) Date: Jul. 18, 2024

(87) PCT Pub. No.: WO2023/175790
    PCT Pub. Date: Sep. 21, 2023

(65) Prior Publication Data
    US 2025/0117464 A1      Apr. 10, 2025

(51) Int. Cl.
    *G06F 21/31*            (2013.01)
(52) U.S. Cl.
    CPC ...... *G06F 21/31* (2013.01); *G06F 2221/2101* (2013.01); *G06F 2221/2117* (2013.01); *G06F 2221/2135* (2013.01)
(58) Field of Classification Search
    CPC ............. G06F 21/31; G06F 2221/2101; G06F 2221/2117
    See application file for complete search history.

(56) References Cited

U.S. PATENT DOCUMENTS

| | | | | |
|---|---|---|---|---|
| 2003/0091724 A1* | 5/2003 | Mizoguchi | ........... | G06V 10/993 |
| | | | | 427/1 |
| 2012/0201431 A1* | 8/2012 | Komura | ................. | G06V 40/67 |
| | | | | 382/115 |
| 2015/0082405 A1* | 3/2015 | Sakemi | .................... | G06F 21/32 |
| | | | | 726/7 |

FOREIGN PATENT DOCUMENTS

| | | | | | |
|---|---|---|---|---|---|
| EP | 2629240 A2 | * | 8/2013 | ............. | G06F 21/30 |
| EP | 2660775 A1 | * | 11/2013 | ........... | G06V 30/242 |
| EP | 3142044 A1 | * | 3/2017 | ............. | G06V 40/12 |
| JP | 2002222424 A | * | 8/2002 | ........... | G06F 10/993 |
| JP | 2007-140823 A | | 6/2007 | | |
| JP | 2008040874 A | * | 2/2008 | | |

(Continued)

OTHER PUBLICATIONS

International Search Report for PCT Application No. PCT/JP2022/012013, mailed on May 17, 2022.

*Primary Examiner* — Hee Soo Kim

(57)          ABSTRACT

An information processing apparatus includes: a first score acquisition unit that performs one-to-N verification by using target data acquired from a verification target and N pieces of registration data registered in advance, thereby acquiring a first matching score; and a second score acquisition unit that transforms the first matching score on the basis of an amount depending on a number of verifications N of the registration data, thereby acquiring a second matching score. According to such an information processing apparatus, it is possible to transform a score of the one-to-N verification into an appropriate value.

6 Claims, 9 Drawing Sheets

(56)        References Cited

FOREIGN PATENT DOCUMENTS

| JP | 2010-108074 | A | | 5/2010 |
|----|-------------|---|---|--------|
| JP | 2011-086202 | A | | 4/2011 |
| JP | 2025109218 | A | * | 7/2025 |
| WO | 2019/207649 | A1 | | 10/2019 |

* cited by examiner

INFORMATION PROCESSING APPARATUS FOR VERIFYING BIOMETRIC AUTHENTICATION SCORES, INFORMATION PROCESSING METHOD, AND NON-TRANSITORY RECORDING MEDIUM

This application is a National Stage Entry of PCT/JP2022/012013 filed on Mar. 16, 2022, the contents of all of which are incorporated herein by reference, in their entirety.

TECHNICAL FIELD

This disclosure relates to technical fields of an information processing apparatus, an information processing method, and a recording medium.

BACKGROUND ART

A known apparatus of this type corrects a matching score outputted in verification processing. For example, Patent Literature 1 discloses that, after calculating a degree of similarity (score) by comparing face images, a score of a verification result is corrected on the basis of a distribution of the score, thereby to perform verification. Patent Literature 2 discloses updating a score distribution of collation with person oneself and a score distribution of collation with others, and correcting a matching score corresponding to a variation included in biometric information upon authentication using those distributions. Patent Literature 3 discloses that a correction parameter is calculated by fitting an extracted score to a normal distribution, and the matching score is corrected on the basis of the correction parameter.

CITATION LIST

Patent Literature

Patent Literature 1: JP2008-040874A
Patent Literature 2: JP2010-108074A
Patent Literature 3: JP2011-086202A

SUMMARY

Technical Problem

This disclosure aims to improve the techniques/technologies disclosed in Citation List.

Solution to Problem

An information processing apparatus according to an example aspect of this disclosure includes: a first score acquisition unit that performs one-to-N verification by using target data acquired from a verification target and N pieces of registration data registered in advance, thereby acquiring a first matching score; and a second score acquisition unit that transforms the first matching score on the basis of an amount depending on a number of verifications N of the registration data, thereby acquiring a second matching score.

An information processing method according to an example aspect of this disclosure includes: performing one-to-N verification by using target data acquired from a verification target and N pieces of registration data registered in advance, thereby acquiring a first matching score; and transforming the first matching score on the basis of an amount depending on a number of verifications N of the registration data, thereby acquiring a second matching score.

A recording medium according to an example aspect of this disclosure is a recording medium on which a computer program that allows at least one computer to execute an information processing method is recorded, the information processing method including: performing one-to-N verification by using target data acquired from a verification target and N pieces of registration data registered in advance, thereby acquiring a first matching score; and transforming the first matching score on the basis of an amount depending on a number of verifications N of the registration data, thereby acquiring a second matching score.

DESCRIPTION OF EXAMPLE EMBODIMENTS

Hereinafter, an information processing apparatus, an information processing method, and a recording medium according to example embodiments will be described with reference to the drawings.

First Example Embodiment

An information processing apparatus according to a first example embodiment will be described with reference to FIG. 1 to FIG. 3.
(Hardware Configuration)

First, with reference to FIG. 1, a hardware configuration of the information processing apparatus according to the first example embodiment will be described. FIG. 1 is a block diagram illustrating the hardware configuration of the information processing apparatus according to the first example embodiment.

Figure 1:
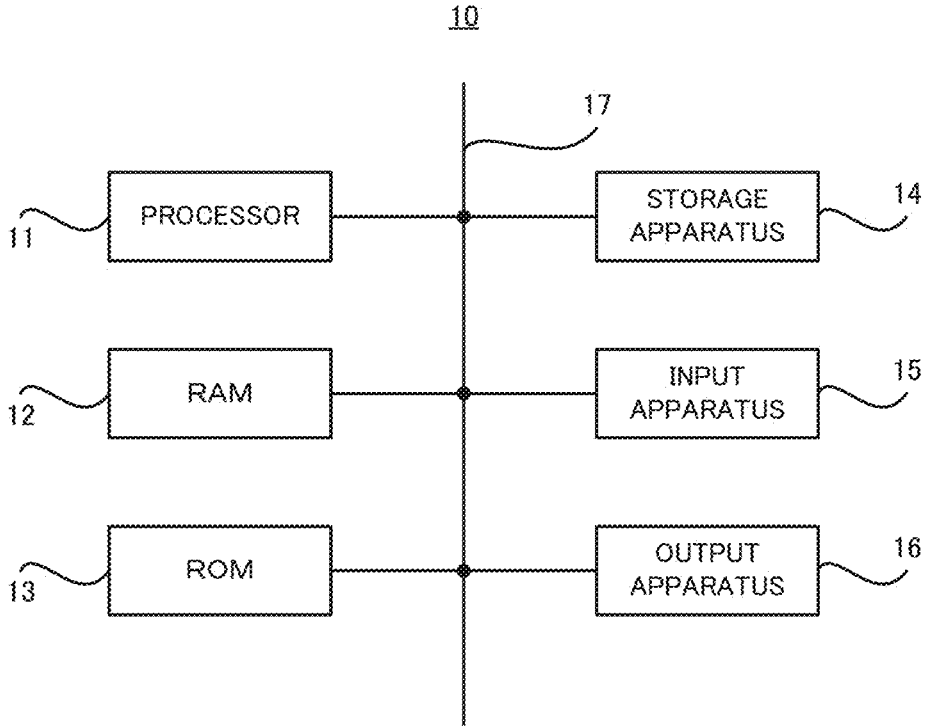
FIG. 1 is a block diagram illustrating a hardware configuration of an information processing apparatus according to a first example embodiment.

As illustrated in FIG. 1, an information processing apparatus 10 according to the first example embodiment includes a processor 11, a RAM (Random Access Memory) 12, a ROM (Read Only Memory) 13, and a storage apparatus 14.

The information processing apparatus 10 may further include an input apparatus 15 and an output apparatus 16. The processor 11, the RAM 12, the ROM 13, the storage apparatus 14, the input apparatus 15, and the output apparatus 16 are connected through a data bus 17.

The processor 11 reads a computer program. For example, the processor 11 is configured to read a computer program stored by at least one of the RAM 12, the ROM 13 and the storage apparatus 14. Alternatively, the processor 11 may read a computer program stored in a computer-readable recording medium, by using a not-illustrated recording medium reading apparatus. The processor 11 may acquire (i.e., may read) a computer program from a not-illustrated apparatus disposed outside the information processing apparatus 10, through a network interface. The processor 11 controls the RAM 12, the storage apparatus 14, the input apparatus 15, and the output apparatus 16 by executing the read computer program. Especially in the present example embodiment, when the processor 11 executes the read computer program, a functional block for acquiring and transforming a matching score is realized or implemented in the processor 11. In this manner, the processor 11 may function as a controller for executing each control in the information processing apparatus 10.

The processor 11 may be configured as, for example, a CPU (Central Processing Unit), a GPU (Graphics Processing Unit), a FPGA (Field-Programmable Gate Array), a DSP (Demand-Side Platform), or an ASIC (Application Specific Integrated Circuit). The processor 11 may be one of them, or may use a plurality of them in parallel.

The RAM 12 temporarily stores the computer program to be executed by the processor 11. The RAM 12 temporarily stores data that are temporarily used by the processor 11 when the processor 11 executes the computer program. The RAM12 may be, for example, a D-RAM (Dynamic Random Access Memory) or a SRAM (Static Random Access Memory). Furthermore, another type of volatile memory may also be used instead of the RAM12.

The ROM 13 stores the computer program to be executed by the processor 11. The ROM 13 may otherwise store fixed data. The ROM13 may be, for example, a P-ROM (Programmable Read Only Memory) or an EPROM (Erasable Read Only Memory).

Furthermore, another type of non-volatile memory may also be used instead of the ROM13. The storage apparatus 14 stores data that are stored by the information processing apparatus 10 for a long time. The storage apparatus 14 may operate as a temporary/transitory storage apparatus of the processor 11. The storage apparatus 14 may include, for example, at least one of a hard disk apparatus, a magneto-optical disk apparatus, a SSD (Solid State Drive), and a disk array apparatus.

The input apparatus 15 is an apparatus that receives an input instruction from a user of the information processing apparatus 10. The input apparatus 15 may include, for example, at least one of a keyboard, a mouse, and a touch panel. The input apparatus 15 may be configured as a portable terminal such as a smartphone and a tablet. The input apparatus 15 may be an apparatus that allows audio input/voice input, including a microphone, for example.

The output apparatus 16 is an apparatus that outputs information about the information processing apparatus 10 to the outside. For example, the output apparatus 16 may be a display apparatus (e.g., a display) that is configured to display the information about the information processing apparatus 10. The output apparatus 16 may be a speaker or the like that is configured to audio-output the information about the information processing apparatus 10. The output apparatus 16 may be configured as a portable terminal such as a smartphone and a tablet. The output apparatus 16 may be an apparatus that outputs information in a form other than an image. For example, the output apparatus 16 may be a speaker that audio-outputs the information about the information processing apparatus 10.

Although FIG. 1 illustrates an example of the information processing apparatus 10 including a plurality of apparatuses, all or a part of the functions may be realized or implemented as a single apparatus. In such a case, the information processing apparatus 10 may include, for example, only the processor 11, the RAM 12, and the ROM 13. The other components (i.e., the storage apparatus 14, the input apparatus 15, and the output apparatus 16) may be provided in an external apparatus connected to the information processing apparatus 10, for example. In addition, in the information processing apparatus 10, a part of an arithmetic function may be realized by an external apparatus (e.g., an external server or cloud, etc.).

(Functional Configuration)

Next, with reference to FIG. 2, a functional configuration of the information processing apparatus 10 according to the first example embodiment will be described. FIG. 2 is a block diagram illustrating the functional configuration of the information processing apparatus according to the first example embodiment.

The information processing apparatus 10 according to the first example embodiment is configured to perform verification processing by using target data acquired from a verification target and registration data registered in advance, and to acquire (calculate) a matching score. The type of the verification processing is not particularly limited, but may be, for example, verification processing using image data. More specifically, the verification processing may be face verification processing (face authentication processing) of verifying a face image of a target, or iris verification processing (iris authentication processing) of verifying an iris image of the target.

Figure 2:
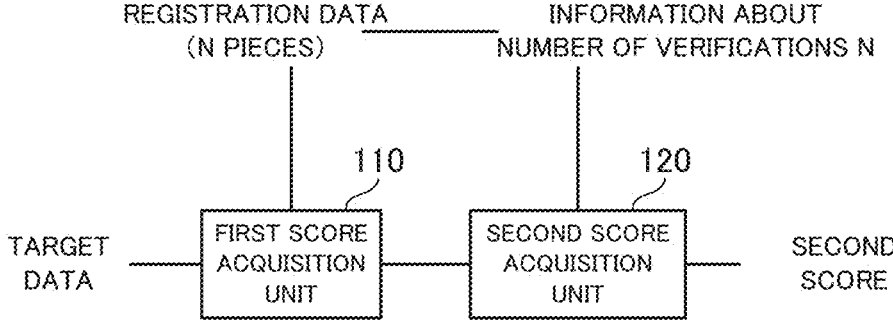
FIG. 2 is a block diagram illustrating a functional configuration of the information processing apparatus according to the first example embodiment.

As illustrated in FIG. 2, the information processing apparatus 10 according to the first example embodiment includes, as components for realizing the functions thereof, a first score acquisition unit 110 and a second score acquisition unit 120. Each of the first score acquisition unit 110 and the second score acquisition unit 120 may be a processing block realized or implemented by the processor 11 (see FIG. 1), for example. Furthermore, each of the first score acquisition unit 110 and the second score acquisition unit 120 may be configured as a neural network.

The first score acquisition unit 110 is configured to acquire a first matching score by performing one-to-N verification using the target data acquired from the verification target and N pieces of registration data registered in advance. The first matching score may be, for example, a score indicating a degree of similarity between the target data and the respective registration data. A method of calculating the first matching score is not particularly limited, and the first matching score may be calculated by properly employing the existing techniques/technologies. The first matching score may be acquired for each of the N pieces of registration data. That is, N first matching scores may be acquired. The number of verifications N in the one-to-N verification may be changeable as appropriate. For example, the number of verifications N may be changed in accordance with setting by the user, or may be changed in accordance with a change in the number of the registration data.

The second score acquisition unit 120 is configured to transform the first matching score, thereby acquiring a second matching score. Specifically, the second score acquisition unit 120 is configured to transform the first matching score on the basis of an amount depending on the number of verifications N. The "amount depending on the number of verifications N" herein is not particularly limited, and may use various parameters that significantly performs transformation depending on the number of verifications N. A specific example of the amount depending on the number of verification N will be described in detail in another example embodiment later. The second score acquisition unit 120 is configured such that information on the number of verifications N is inputted thereto, on the basis of the N pieces of registration data used for the one-to-N verification in the first score acquisition unit 110. The information on the number of verifications N may be the amount depending on the number of verifications N described above. Alternatively, the information on the number of verifications N may be a value of N itself. In this instance, the second score acquisition unit 120 may calculate the amount depending on the number of verifications N from the value of N.

(Flow of Operation)

Next, with reference to FIG. 3, a flow of operation of the information processing apparatus 10 according to the first example embodiment (specifically, a flow until outputting the second matching score) will be described. FIG. 3 is a flowchart illustrating the flow of the operation of the information processing apparatus according to the first example embodiment.

Figure 3:
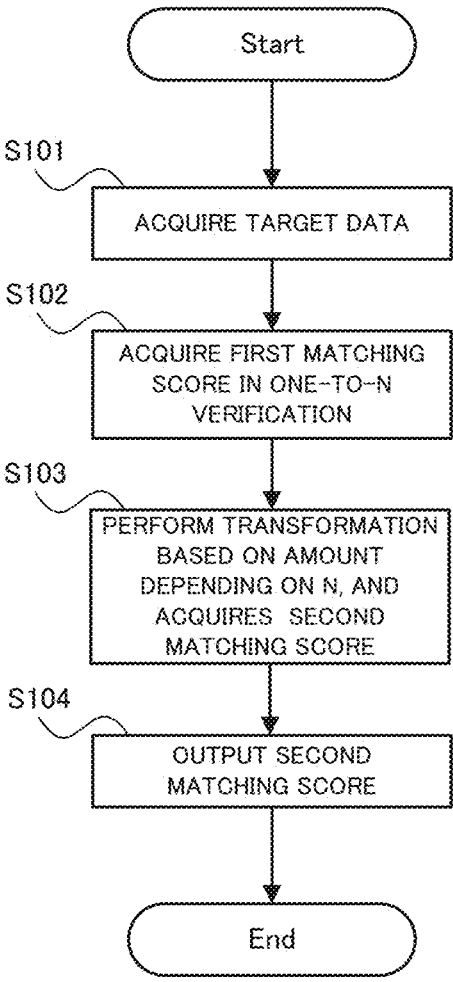
FIG. 3 is a flowchart illustrating a flow of operation of the information processing apparatus according to the first example embodiment.

As illustrated in FIG. 3, when the operation by the information processing apparatus 10 according to the first example embodiment is started, first, the first score acquisition unit 110 acquires the target data from the verification target (step S101). The first score acquisition unit 110 may capture an image including the target, and may acquire the image data as the target data, for example. Alternatively, the first score acquisition unit 110 may acquire a feature quantity extracted from the image data, as the target data.

Subsequently, the first score acquisition unit 110 performs the one-to-N verification by using the acquired target data and the N pieces of registration data registered in advance, and acquires the first matching score (step S102). The first score acquisition unit 110 outputs the acquired first matching score to the second score acquisition unit 120.

Subsequently, the second score acquisition unit 120 transforms the first matching score on the basis of the amount depending on the number of verifications N, and acquires the second matching score (step S103). Then, the second score acquisition unit 120 outputs the acquired second matching score (step S104).

(Technical Effect)

Next, a technical effect obtained by the information processing apparatus 10 according to the first example embodiment will be described.

As described with reference to FIG. 1 to FIG. 3, in the information processing apparatus 10 according to the first example embodiment, the first matching score is acquired in the one-to-N verification, and the first matching score is transformed on the basis of the amount depending on the number of matched items N, thereby acquiring the second matching score. In this way, it is possible to transform the first matching score acquired by the one-to-N verification, into an appropriate score (i.e., the second matching score) in accordance with the number of verifications N. In other words, it is possible to perform appropriate score calibration on the first matching score, in accordance with the number of verifications N. Therefore, according to the information processing apparatus in the present example embodiment, it is possible to acquire a more appropriate matching score in the one-to-N verification. For example, in authentication processing using the matching score (e.g., processing of determining whether the verification target is a registered person oneself or another person), it is possible to acquire the score from which an appropriate result is obtained.

Second Example Embodiment

The information processing apparatus 10 according to a second example embodiment will be described with reference to FIG. 4 and FIG. 5. The second example embodiment is partially different from the first example embodiment only in the configuration and operation, and may be the same as the first example embodiment in the other parts. For this reason, a part that is different from the first example embodiment will be described in detail below, and a description of the other overlapping parts will be omitted as appropriate.

(Functional Configuration)

Next, a with reference to FIG. 4, a functional configuration of the information processing apparatus 10 according to the second example embodiment will be described. FIG. 4 is a block diagram illustrating the functional configuration of the information processing apparatus according to the second example embodiment. In FIG. 4, the same components as those illustrated in FIG. 2 carry the same reference numerals.

Figure 4:
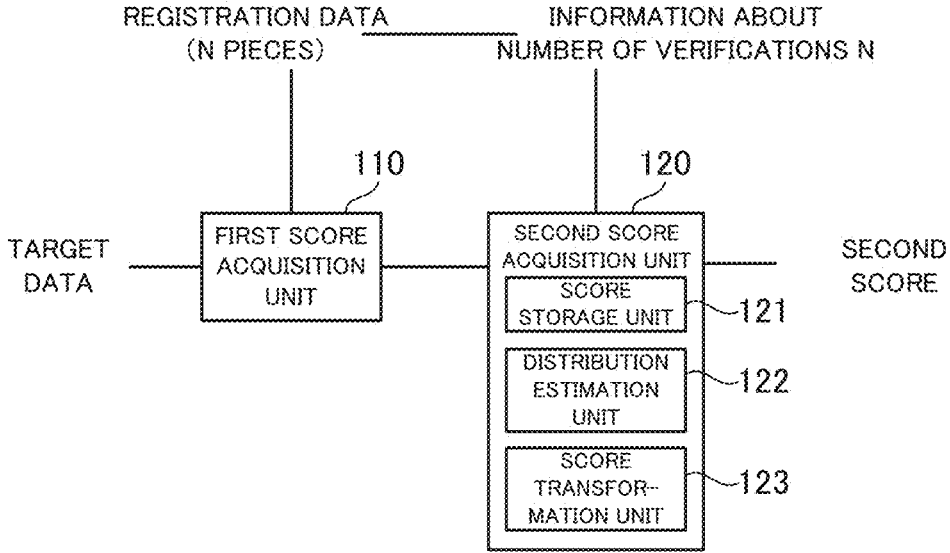
FIG. 4 is a block diagram illustrating a functional configuration of an information processing apparatus according to a second example embodiment.

As illustrated in FIG. 4, the information processing apparatus 10 according to the second example embodiment includes, as components for realizing the functions thereof, the first score acquisition unit 110 and the second score acquisition unit 120. In particular, the second score acquisition unit 120 according to the second example embodiment includes a score storage unit 121, a distribution estimation unit 122, and a score transformation unit 123.

The score storage unit 121 is configured to store a plurality of matching scores acquired by one-to-one verification (hereinafter properly referred to as "third matching scores"). The third matching score may be, for example, another person score in the one-to-one verification (i.e., a score between others). The score storage unit 121 may store the third matching scores acquired by the one-to-one verification that is performed in advance by the user, for example. Alternatively, the score storage unit 121 may have a function of automatically collecting and storing the third matching scores, for example. The plurality of third matching scores stored in the score storage unit 121 re configured to be properly read by the distribution estimation unit 122.

The distribution estimation unit 122 estimates a distribution of fourth matching scores acquired by the one-to-N verification (where N corresponds to N in the one-to-N verification in the first score acquisition unit 110) on the basis of the plurality of third matching scores stored in the score storage unit 121. The distribution of the fourth matching scores here is a specific example of the "amount dependent on N" described in the first example embodiment. The fourth matching score may be, for example, another person score in the one-to-N verification (e.g., a k-order another person score: a k-th score of N persons). A technique/method of estimating the distribution of the fourth matching scores is not particularly limited. A specific example of technique/method of estimating the distribution of the fourth matching scores will be described in detail in another example embodiment later.

The score transformation unit 123 is configured to transform the first matching score on the basis of the distribution of the fourth matching scores estimated by the distribution estimation unit 122, thereby acquiring the second matching score. The score transformation unit 123 may acquire the second matching score, for example, by applying a transformation function determined in accordance with the distribution of the fourth matching scores, for the first matching score. A specific transformation example by the score transformation unit 123 will be described in detail in another example embodiment later.

(Flow of Operation)

Next, with reference to FIG. 5, a flow of operation of the information processing apparatus 10 according to the second example embodiment will be described. FIG. 5 is a flowchart illustrating the flow of the operations of the information processing apparatus according to the second example embodiment. In FIG. 5, the same steps as those illustrated in FIG. 3 carry the same reference numerals.

Figure 5:
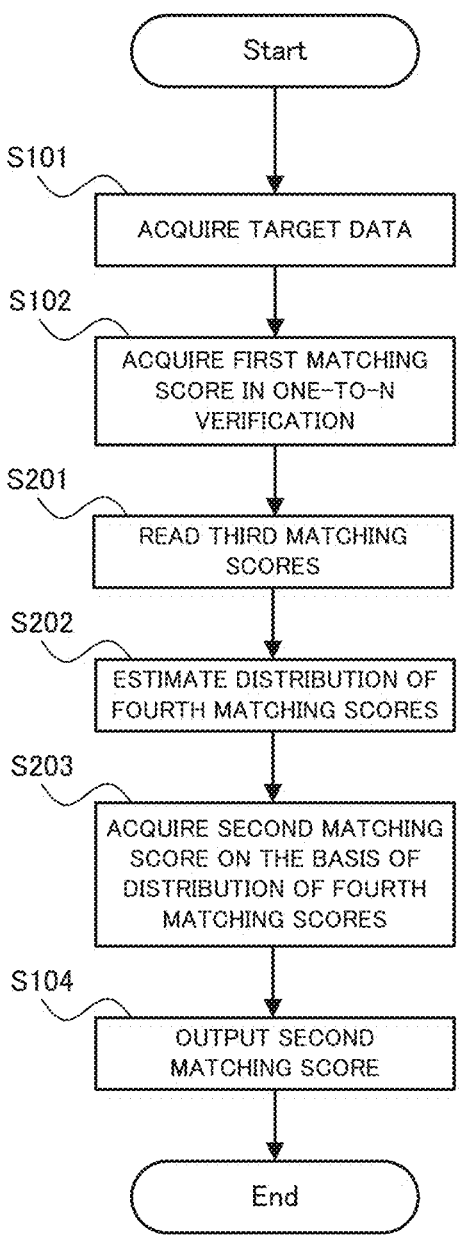
FIG. 5 is a flowchart illustrating a flow of operation of the information processing apparatus according to the second example embodiment.

As illustrated in FIG. 5, when the operation by the information processing apparatus 10 according to the second example embodiment is started, first, the first score acquisition unit 110 acquires the target data from the verification target (step S101). Subsequently, the first score acquisition unit 110 performs the one-to-N verification by using the acquired target data and the N pieces of registration data registered in advance, and acquires the first matching score (step S102). The first score acquisition unit 110 outputs the acquired first matching score to the second score acquisition unit 120.

Subsequently, the distribution estimation unit 122 in the second score acquisition unit 120 reads the third matching scores stored in the score storage unit 121 (step S201). Then, the distribution estimation unit 122 estimates the distribution of the fourth matching scores on the basis of the read third matching scores (step S202). The distribution estimation unit 122 outputs the estimated distribution of the fourth matching score to the score transformation unit 123.

Subsequently, the score transformation unit 123 transforms the first matching score on the basis of the distribution of the fourth matching scores estimated by the distribution estimation unit 122, and acquires the second matching score (step S203). Then, the second score acquisition unit 120 outputs the acquired second matching score (step S104).

(Technical Effect)

Next, a technical effect obtained by the information processing apparatus 10 according to the second example embodiment will be described.

As described in FIG. 4 and FIG. 5, in the information processing apparatus 10 according to the second example embodiment, the distribution of one-to-N matching scores (i.e., the fourth matching scores) is estimated on the basis of a plurality of one-to-one matching scores (i.e., the third matching scores) stored in advance. Then, the first matching score is transformed into the second matching score on the basis of the distribution of the one-to-N matching scores. In this way, it is possible to transform the one-to-N matching score into an appropriate value by using the plurality of one-to-one matching scores. In other words, even if the distribution of the one-to-N matching scores is not prepared in advance, the one-to-N matching score may be transformed into an appropriate value. It is not easy to prepare the distribution of the one-to-N matching scores in advance, in various patterns in which N varies. On the other hand, it is relatively easy to prepare a plurality of (N or more) one-to-one matching scores. Therefore, in the second example embodiment, it is possible to acquire an appropriate matching score while reducing labor and cost of preparing data in advance.

Third Example Embodiment

The information processing apparatus 10 according to a third example embodiment will be described with reference to FIG. 6. The third example embodiment is partially different from the second example embodiment only in operation, and may be the same as the first and second example embodiments in the other parts. For this reason, a part that is different from each of the example embodiments described above will be described in detail below, and a description of the other overlapping parts will be omitted as appropriate.

(Flow of Operation)

First, with reference to FIG. 6, a flow of operation of the information processing apparatus 10 according to the third example embodiment will be described. FIG. 6 is a flowchart illustrating the flow of the operation of the information processing apparatus according to the third example embodiment. In FIG. 6, the same steps as those illustrated in FIG. 5 carry the same reference numerals.

Figure 8:
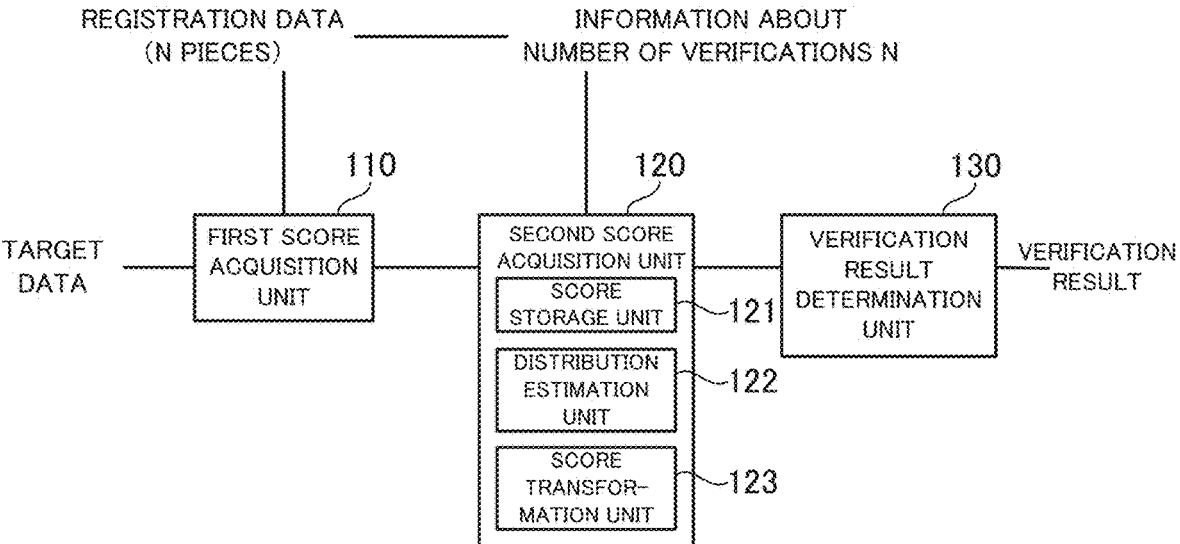
FIG. 8 is a block diagram illustrating a functional configuration of an information processing apparatus according to a fifth example embodiment.

As illustrated in FIG. 8, when the operation by the information processing apparatus 10 according to the third example embodiment is started, first, the first score acquisition unit 110 acquires the target data from the verification target (step S101). Subsequently, the first score acquisition unit 110 performs the one-to-N verification by using the acquired target data and the N pieces of registration data registered in advance, and acquires the first matching score (step S102). The first score acquisition unit 110 outputs the acquired first matching score to the second score acquisition unit 120.

Subsequently, the distribution estimation unit 122 in the second score acquisition unit 120 reads the third matching scores stored in the score storage unit 121 (step S201). Then, the distribution estimation unit 122 applies an order statistic formula to the read third matching scores (e.g., uses it as an approximation), and estimates the distribution of the fourth matching scores (step S301). The order statistic formula here may be expressed as the following equation (1), for example.

[Equation 1]

$$p(s|k) = \frac{N!}{(k-1)!\,(N-k)!} F(s)^{N-k}(1 - F(s))^{N-1} f(s) \tag{1}$$

where F(s) is a cumulative density distribution of the third matching scores. In addition, f(s) is a probability density distribution of the third matching scores.

Subsequently, the score transformation unit 123 transforms the first matching score on the basis of the estimated distribution of the fourth matching scores, and acquires the second matching score (step S203). Then, the second score acquisition unit 120 outputs the acquired second matching score (step S104).

(Technical Effect)

Next, a technical effect obtained by the information processing apparatus 10 according to the third example embodiment will be described.

Figure 6:
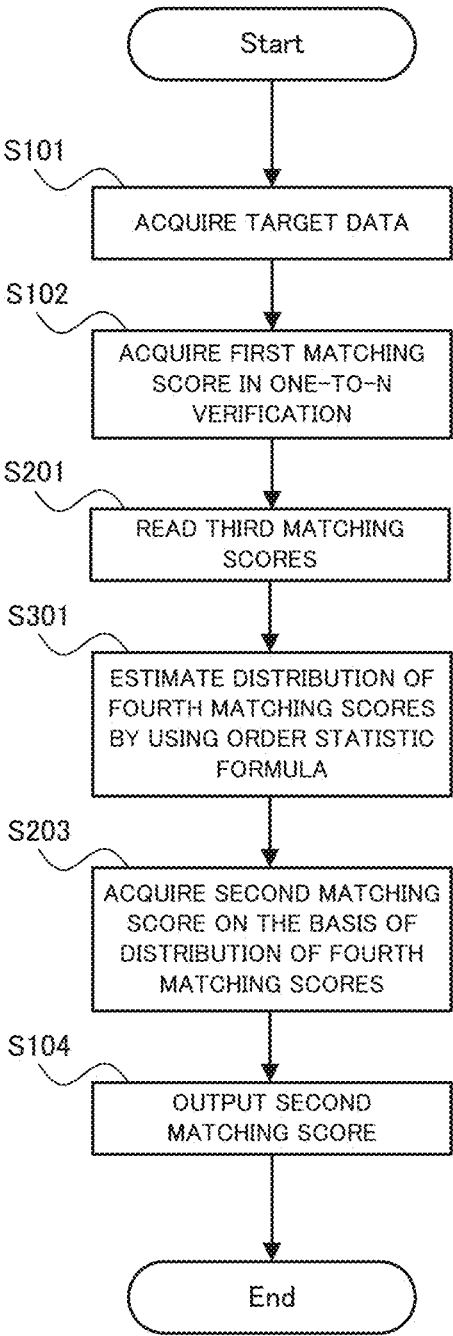
FIG. 6 is a flowchart illustrating a flow of operation of an information processing apparatus according to a third example embodiment.

As described in FIG. 6, in the information processing apparatus 10 according to the third example embodiment, the distribution of the one-to-N matching scores (i.e., the distribution of the fourth matching scores) is estimated by applying the order statistic formula. In this way, it is possible to estimate the distribution of the one-to-N matching scores, easily and accurately, by using the one-to-one matching scores (i.e., the third matching scores).

Fourth Example Embodiment

The information processing apparatus 10 according to a fourth example embodiment will be described with reference to FIG. 7. The fourth example embodiment is partially different from the second example embodiment only in operation, and may be the same as the first to third example embodiments in the other parts. For this reason, a part that is different from each of the example embodiments described above will be described in detail below, and a description of the other overlapping parts will be omitted as appropriate.

(Flow of Operation)

First, with reference to FIG. 7, a flow of operation of the information processing apparatus 10 according to the fourth example embodiment will be described. FIG. 7 is a flow-chart illustrating the flow of the operation of the information processing apparatus according to the fourth example embodiment. In FIG. 7, the same steps as those illustrated in FIG. 5 carry the same reference numerals.

Figure 7:
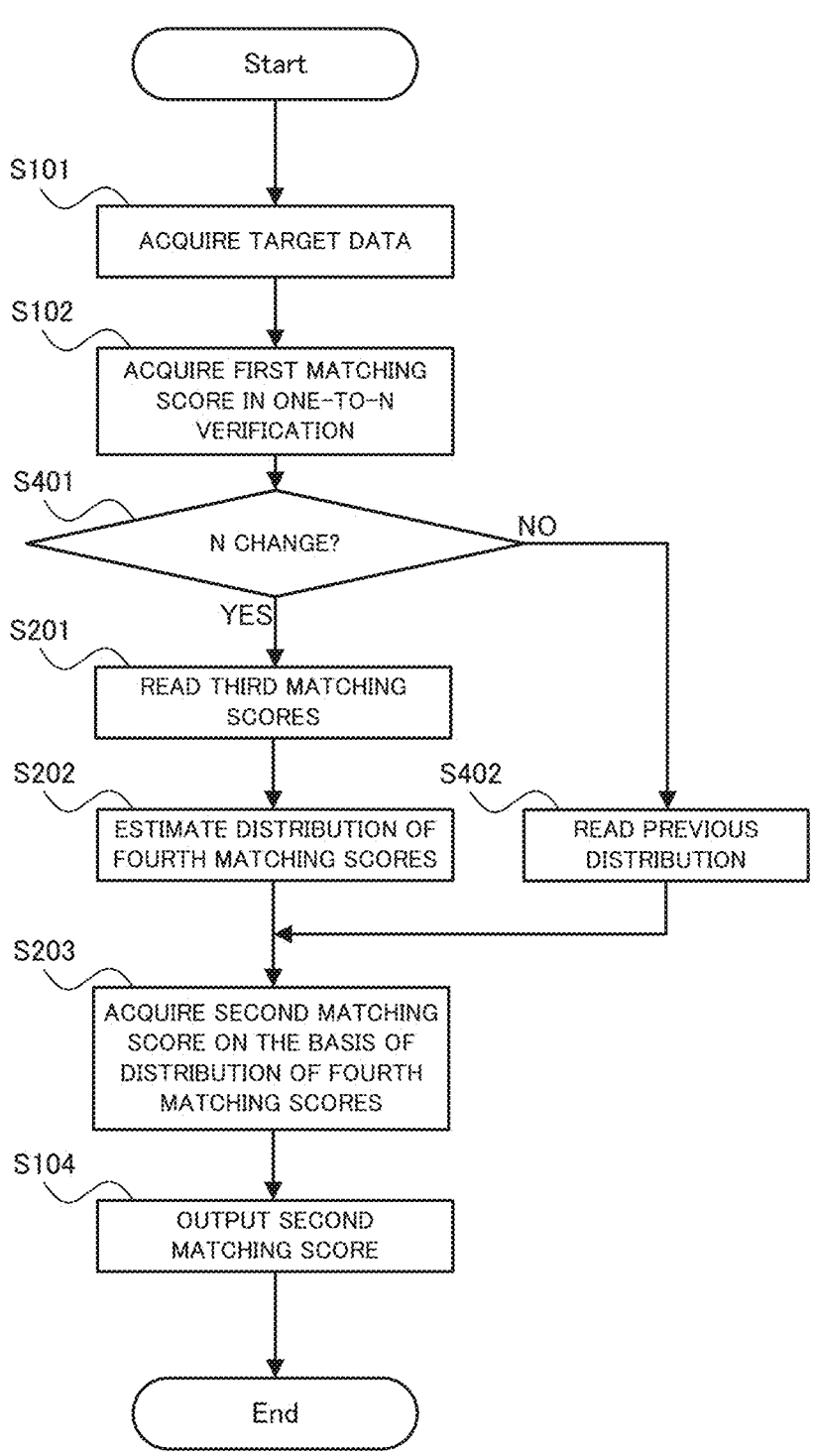
FIG. 7 is a flowchart illustrating a flow of operation of an information processing apparatus according to a fourth example embodiment.

As illustrated in FIG. 7, when the operation by the information processing apparatus 10 according to the fourth example embodiment is started, first, the first score acqui-sition unit 110 acquires the target data from the verification target (step S101). Subsequently, the first score acquisition unit 110 performs the one-to-N verification by using the acquired target data and the N pieces of registration data registered in advance, and acquires the first matching score (step S102). The first score acquisition unit 110 outputs the acquired first matching score to the second score acquisition unit 120.

Subsequently, the second score acquisition unit 120 deter-mines whether the value of N changes from that of a previous time (i.e., when the second matching score is acquired previously) (step S401). When N changes (the step S401: YES), the same processing as that in the second example embodiment described above (see FIG. 5) is per-formed. That is, the distribution estimation unit 122 in the second score acquisition unit 120 reads the third matching scores stored in the score storage unit 121 (step S201). Then, the distribution estimation unit 122 estimates the distribu-tion of the fourth matching scores on the basis of the read third matching scores (step S202).

On the other hand, when N does not change (the step S401: NO), the distribution estimation unit 122 reads a previously estimated distribution and outputs it to the score transformation unit 123 (step S402). That is, when N does not change, the distribution estimation unit 122 performs processing of reusing the previously estimated distribution without newly estimating the distribution of the fourth matching scores.

Subsequently, the score transformation unit 123 trans-forms the first matching score on the basis of the distribution of the fourth matching scores estimated by the distribution estimation unit 122 (specifically, a newly estimated distri-bution when N changes, and the previous distribution when N does not change) and acquires a second matching score (step S203). Then, the second score acquisition unit 120 outputs the acquired second matching score (step S104).

(Technical Effect)

Next, a technical effect obtained by the information processing apparatus 10 according to the fourth example embodiment will be described.

As described in FIG. 7, in the information processing apparatus 10 according to the fourth example embodiment, the distribution of the one-to-N matching scores (i.e., the distribution of the fourth matching scores) is estimated at each time the number of verification N changes. In this way, even when N changes, it is possible to acquire an appropriate matching score corresponding to N after it changes. Fur-thermore, since the previous distribution is used when N does not change, it is possible to reduce a processing load, as compared with a case of estimating the distribution every time.

Fifth Example Embodiment

The information processing apparatus 10 according to a fifth example embodiment will be described with reference to FIG. 8 and FIG. 9. The fifth example embodiment is partially different from the first to fourth example embodi-ments only in the configuration and operation, and may be the same as the first to fourth example embodiments in the other parts. For this reason, a part that is different from each of the example embodiments described above will be described in detail below, and a description of the other overlapping parts will be omitted as appropriate.

(Functional Configuration)

First, with reference to FIG. 8, a functional configuration of the information processing apparatus 10 according to the fifth example embodiment will be described. FIG. 8 is a block diagram illustrating the functional configuration of the information processing apparatus according to the fifth example embodiment. In FIG. 8 the same components as those illustrated in FIG. 4 carry the same reference numer-als.

As illustrated in FIG. 8, the information processing appa-ratus 10 according to the fifth example embodiment includes, as components for realizing the functions thereof, the first score acquisition unit 110, the second score acqui-sition unit 120, and a verification result determination unit 130. That is, the information processing apparatus 10 according to the fifth example embodiment further includes the verification result determination unit 130 in addition to the configuration in the second example embodiment (see FIG. 4). The verification result determination unit 130 may be a processing block that is realized or implemented by the processor 11 (see FIG. 1), for example.

The verification result determination unit 130 is config-ured to determine a verification result by using the second matching score. For example, the verification result deter-mination unit 130 may be configured to determine whether the verification is successful or failed, on the basis of magnitude of the second matching score. The verification result determination unit 130 may store a determination threshold to be compared with the second matching score, and may determine a success or a failure of the verification depending on whether or not the second matching score exceeds the determination threshold, for example. The veri-fication result may be, for example, a personal authentica-tion result in biometric authentication. In this case, the verification result determination unit 130 may output whether the verification target is a registered person or another person, as the verification result.

The score transformation unit 123 according to the pres-ent example embodiment is configured to transform the first matching score such that the second matching score and a False Positive Identification Rate in the verification result determination unit 130 are in a predetermined relation. The predetermined relation may be one set in advance, or may be one inputted by the user at each time. That is, the predetermined relation may be one that is changeable as appropriate. A specific transformation example will be described in detail in the following description of operation.

(Flow of Operation)

Next, with reference to FIG. 9, a flow of operation of the information processing apparatus 10 according to the fifth example embodiment will be described. FIG. 9 is a flowchart illustrating the flow of the operation of the information processing apparatus according to the fifth example embodiment. In FIG. 9, the same steps as those illustrated in FIG. 5 carry the same reference numerals.

Figure 9:
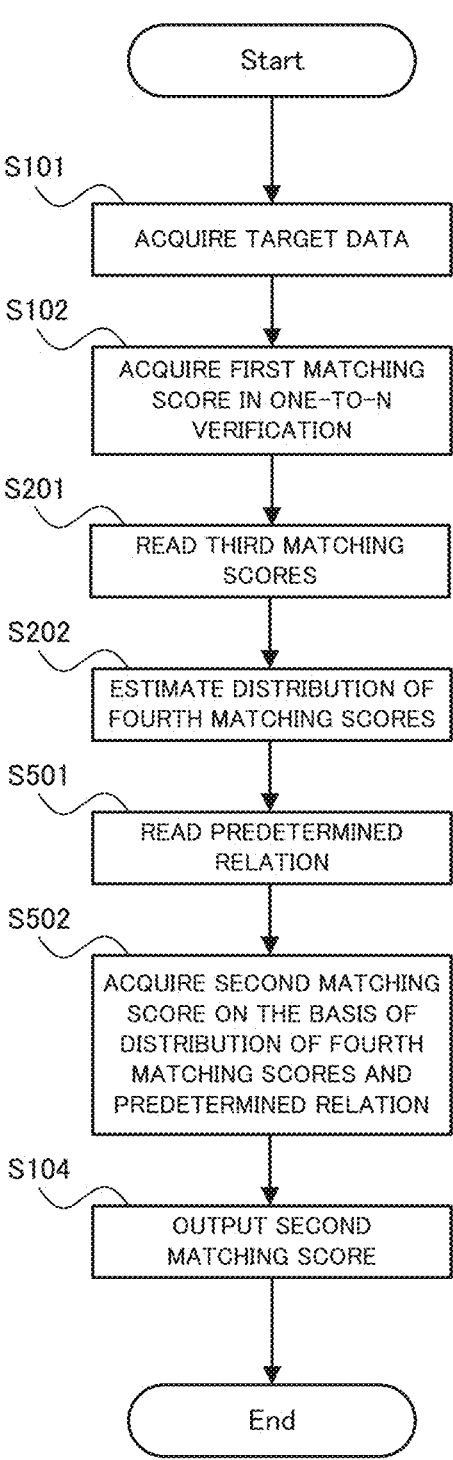
FIG. 9 is a flowchart illustrating a flow of operation of the information processing apparatus according to the fifth example embodiment.

As illustrated in FIG. 9, when the operation by the information processing apparatus 10 according to the fifth example embodiment is started, first, the first score acquisition unit 110 acquires the target data from the verification target (step S101). Subsequently, the first score acquisition unit 110 performs the one-to-N verification by using the acquired target data and the N pieces of registration data registered in advance, and acquires the first matching score (step S102). The first score acquisition unit 110 outputs the acquired first matching score to the second score acquisition unit 120.

Subsequently, the distribution estimation unit 122 in the second score acquisition unit 120 reads the third matching scores stored in the score storage unit 121 (step S201). Then, the distribution estimation unit 122 estimates the distribution of the fourth matching scores on the basis of the read third matching scores (step S202). The distribution estimation unit 122 outputs the estimated distribution of the fourth matching scores to the score transformation unit 123.

Subsequently, the score transformation unit 123 reads the predetermined relation (step S501). That is, the score transformation unit 123 reads a relation between the second matching score set in advance and the False Positive Identification Rate in the verification result determination unit 130. Then, the score transformation unit 123 transforms the first matching score so as to satisfy the predetermined relation, on the basis of the distribution of the fourth matching scores estimated by the distribution estimation unit 122, and acquires the second matching score (step S502). Then, the second score acquisition unit 120 outputs the acquired second matching score (step S104).

For example, let us assume that the distribution estimation unit 122 estimates a complementary cumulative distribution I(s|k=1) of a first-order another person score expressed by the following equation (2), as the distribution of the fourth matching score.

[Equation 2]

$$I(s|k = 1) = 1 - F(s)^N \qquad (2)$$

In this case, the score transformation unit 123 prepares a transformation function expressed by the following equation (3), on the basis of the above distribution.

[Equation 3]

$$s' = -0.2 \times \log_{10}(I(s|k = 1)) \qquad (3)$$

In the above example, the transformation is performed such that when the second matching score after transformation is "0.4", the False Positive Identification Rate is "1e-2", and when the second matching score after transformation is "0.6", the False Positive Identification Rate is "1e-3". The relation described here is merely an example, and the predetermined relation may be properly set under desired conditions.

*Technical Effect)

Next, a technical effect obtained by the information processing apparatus 10 according to the fifth example embodiment will be described.

As described in FIG. 8 and FIG. 9, in the information processing apparatus 10 according to the fifth example embodiment, the first matching score is transformed such that the second matching score and the False Positive Identification Rate in the verification result are in the predetermined relation. In this way, it is possible to transform (i.e., calibrate) the matching score such that a desired determination result is obtained in the verification processing.

A processing method that is executed on a computer by recording, on a recording medium, a program for allowing the configuration in each of the example embodiments to be operated so as to realize the functions in each example embodiment, and by reading, as a code, the program recorded on the recording medium, is also included in the scope of each of the example embodiments. That is, a computer-readable recording medium is also included in the range of each of the example embodiments. Not only the recording medium on which the above-described program is recorded, but also the program itself is also included in each example embodiment.

The recording medium to use may be, for example, a floppy disk (registered trademark), a hard disk, an optical disk, a magneto-optical disk, a CD-ROM, a magnetic tape, a nonvolatile memory card, or a ROM. Furthermore, not only the program that is recorded on the recording medium and that executes processing alone, but also the program that operates on an OS and that executes processing in cooperation with the functions of expansion boards and another software, is also included in the scope of each of the example embodiments. In addition, the program itself may be stored in a server, and a part or all of the program may be downloaded from the server to a user terminal.

SUPPLEMENTARY NOTES

The example embodiments described above may be further described as, but not limited to, the following Supplementary Notes below.

Supplementary Note 1

An information processing apparatus according to Supplementary Note 1 is an information processing apparatus including: a first score acquisition unit that performs one-to-N verification by using target data acquired from a verification target and N pieces of registration data registered in advance, thereby acquiring a first matching score; and a second score acquisition unit that transforms the first matching score on the basis of an amount depending on a number of verifications N of the registration data, thereby acquiring a second matching score.

Supplementary Note 2

An information processing apparatus according to Supplementary Note 2 is the information processing apparatus according to Supplementary Note 1, wherein the second score acquisition unit includes: a storage unit that stores a plurality of third matching scores acquired by one-to-one verification; an estimation unit that estimates a distribution of fourth matching scores acquired by one-to-N verification corresponding to the number of verifications N, on the basis of the plurality of third matching scores; and a score transformation unit that transforms the first matching score on the basis of the distribution of the fourth matching scores, thereby acquiring the second matching score.

Supplementary Note 3

An information processing apparatus according to Supplementary Note 3 is the information processing apparatus according to Supplementary Note 2, wherein the estimation unit estimates the distribution of the fourth matching scores by applying an order statistic formula to the plurality of third matching scores.

Supplementary Note 4

An information processing apparatus according to Supplementary Note 4 is the information processing apparatus according to Supplementary Note 2 or 3, wherein the estimation unit estimates the distribution of the fourth matching scores at each time the number of the verifications N changes.

Supplementary Note 5

An information processing apparatus according to Supplementary Note 5 is the information processing apparatus according to any one of Supplementary Notes 2 to 4, further including a verification result determination unit that determines a verification result by using the second matching score, wherein the score transformation unit transforms the first matching score such that the second matching score and a False Positive Identification Rate in the verification result are in a predetermined relation.

Supplementary Note 6

An information processing method according to Supplementary Note 6 is an information processing method that is executed by at least one computer, the information processing method including: performing one-to-N verification by using target data acquired from a verification target and N pieces of registration data registered in advance, thereby acquiring a first matching score; and transforming the first matching score on the basis of an amount depending on a number of verifications N of the registration data, thereby acquiring a second matching score.

Supplementary Note 7

An information processing method according to Supplementary Note 7 is a recording medium on which a computer program that allows at least one computer to execute an information processing method is recorded, the information processing method including: performing one-to-N verification by using target data acquired from a verification target and N pieces of registration data registered in advance, thereby acquiring a first matching score; and transforming the first matching score on the basis of an amount depending on a number of verifications N of the registration data, thereby acquiring a second matching score.

Supplementary Note 8

A computer program according to Supplementary Note 8 is a computer program that allows at least one computer to execute an information processing method, the information processing method including: performing one-to-N verification by using target data acquired from a verification target and N pieces of registration data registered in advance, thereby acquiring a first matching score; and transforming the first matching score on the basis of an amount depending on a number of verifications N of the registration data, thereby acquiring a second matching score.

Supplementary Note 9

An information processing system according to Supplementary Note 9 is an information processing system including: a first score acquisition unit that performs one-to-N verification by using target data acquired from a verification target and N pieces of registration data registered in advance, thereby acquiring a first matching score; and a second score acquisition unit that transforms the first matching score on the basis of an amount depending on a number of verifications N of the registration data, thereby acquiring a second matching score.

This disclosure is allowed to be changed, if desired, without departing from the essence or spirit of this disclosure which can be read from the claims and the entire specification. An information processing apparatus, an information processing method, and a recording medium with such changes are also intended to be within the technical scope of this disclosure.

DESCRIPTION OF REFERENCE CODES

10 Information processing apparatus
11 Processor
14 Storage apparatus
110 First score acquisition unit
120 Second Score acquisition unit
121 Score storage unit
122 Distribution estimation unit
123 Score transformation unit
130 Verification result determination unit

What is claimed is:
1. An information processing apparatus comprising:
at least one memory that is configured to store instructions; and
at least one processor that is configured to execute the instructions to:
receive captured target data for a verification target, wherein the captured target data comprises image data of the verification target;
perform one-to-N verification by using the target data acquired from the verification target and N pieces of registration data registered in advance, thereby acquiring a first matching score;
store a plurality of third matching scores acquired by one-to-one verification;

determine whether a value of N has changed from a previous iteration of verification;

estimate, in response to a determination that the value of N changed, a new distribution of fourth matching scores acquired by one-to-N verification corresponding to the number of verifications N, on the basis of the plurality of third matching scores;

utilize, in response to a determination that the value of N is unchanged, a previously determined distribution of the fourth matching scores;

transform the first matching score on the basis of the new distribution of the fourth matching scores in response to the determination that the value of N change, thereby acquiring a second matching score; and transform the first matching score on the basis of the previously determined distribution of the fourth matching scores in response to the determination that the value of N is unchanged, thereby acquiring the second matching score.

2. The information processing apparatus according to claim 1, wherein the at least one processor is configured to execute the instructions to estimate the distribution of the fourth matching scores by applying an order statistic formula to the plurality of third matching scores.

3. The information processing apparatus according to claim 1, wherein the at least one processor is configured to execute the instructions to estimate the distribution of the fourth matching scores at each time the number of the verifications N changes.

4. The information processing apparatus according to claim 1, wherein the at least one processor is configured to execute the instructions to:

determine a verification result by using the second matching score; and transform the first matching score such that the second matching score and a False Positive Identification Rate in the verification result are in a predetermined relation.

5. An information processing method that is executed by at least one computer, the information processing method comprising:

capturing target data for a verification target, wherein capturing the target data comprises capturing an image of the verification target;

performing one-to-N verification by using the target data acquired from the verification target and N pieces of registration data registered in advance, thereby acquiring a first matching score;

storing a plurality of third matching scores acquired by one-to-one verification;

determining whether a value of N has changed from a previous iteration of verification;

estimating, in response to a determination that the value of N changed, a new distribution of fourth matching scores acquired by one-to-N verification corresponding to the number of verifications N, on the basis of the plurality of third matching scores;

utilizing, in response to a determination that the value of N is unchanged, a previously determined distribution of the fourth matching scores; and transforming the first matching score on the basis of the new distribution of the fourth matching scores in response to the determination that the value of N change, thereby acquiring a second matching score; and transforming the first matching score on the basis of the previously determined distribution of the fourth matching scores in response to the determination that the value of N is unchanged, thereby acquiring the second matching score.

6. A non-transitory recording medium on which a computer program that allows at least one computer to execute an information processing method is recorded, the information processing method including:

receiving captured target data for a verification target, wherein the captured target data comprises image data of the verification target;

performing one-to-N verification by using the target data acquired from the verification target and N pieces of registration data registered in advance, thereby acquiring a first matching score;

storing a plurality of third matching scores acquired by one-to-one verification;

determining whether a value of N has changed from a previous iteration of verification;

estimating, in response to a determination that the value of N changed, a new distribution of fourth matching scores acquired by one-to-N verification corresponding to the number of verifications N, on the basis of the plurality of third matching scores;

utilizing, in response to a determination that the value of N is unchanged, a previously determined distribution of the fourth matching scores; and transforming the first matching score on the basis of the new distribution of the fourth matching scores in response to the determination that the value of N change, thereby acquiring a second matching score; and transforming the first matching score on the basis of the previously determined distribution of the fourth matching scores in response to the determination that the value of N is unchanged, thereby acquiring the second matching score.

* * * * *